J. F. MASSEY.
ANIMAL STOCK.
APPLICATION FILED MAY 17, 1916.
1,209,004.
Patented Dec. 19, 1916.
3 SHEETS—SHEET 1.
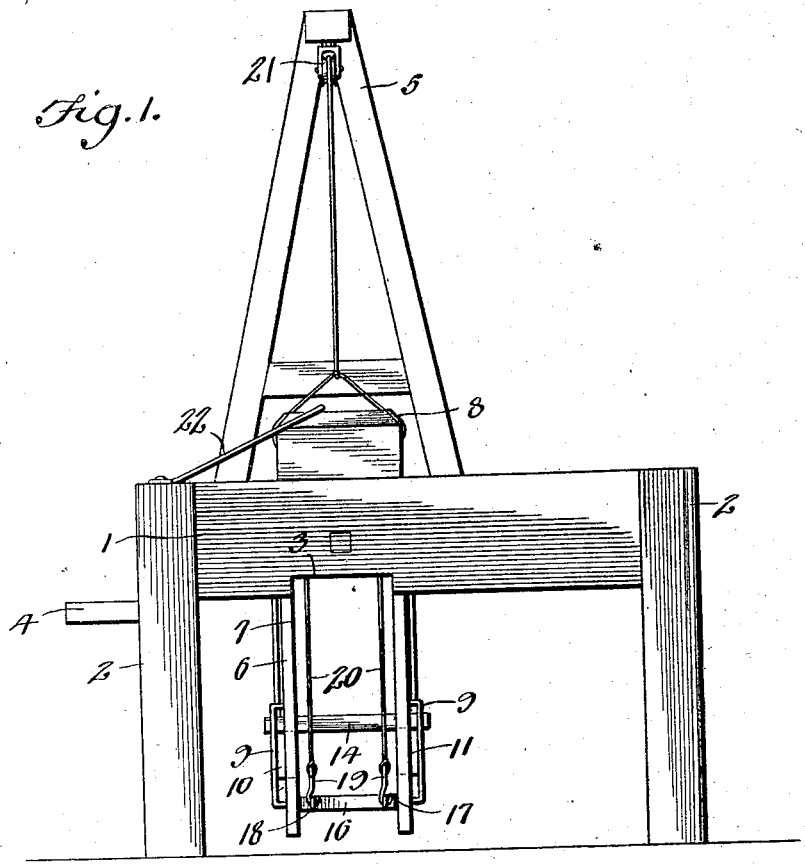
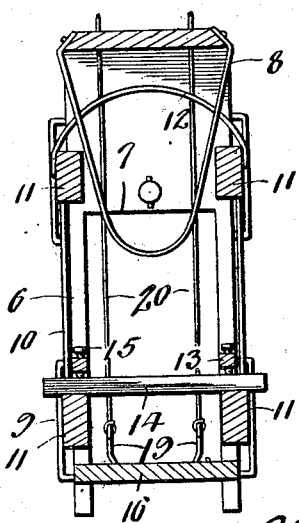
Inventor
J. F. Massey,
By Victor J. Evans
Attorney

J. F. MASSEY.
ANIMAL STOCK.
APPLICATION FILED MAY 17, 1916.

1,209,004.

Patented Dec. 19, 1916.
3 SHEETS—SHEET 2.

Witnesses
Inventor
J. F. Massey
By Victor J. Evans
Attorney

J. F. MASSEY.
ANIMAL STOCK.
APPLICATION FILED MAY 17, 1916.

1,209,004.

Patented Dec. 19, 1916.
3 SHEETS—SHEET 3.

Inventor
J. F. Massey

Witnesses

By Victor J. Evans
Attorney

UNITED STATES PATENT OFFICE.

JAMES F. MASSEY, OF ROCK MART, GEORGIA.

ANIMAL-STOCK.

1,209,004.

Specification of Letters Patent.   Patented Dec. 19, 1916.

Application filed May 17, 1916. Serial No. 98,162.

*To all whom it may concern:*

Be it known that I, JAMES F. MASSEY, a citizen of the United States, residing at Rock Mart, in the county of Polk and State of Georgia, have invented new and useful Improvements in Animal-Stocks, of which the following is a specification.

This invention relates to animal stocks and it consists in the novel features hereinafter described and claimed.

An object of the invention is to provide a stock of the character indicated especially adapted to be used by shoers when applying shoes to the hoofs of animals and also adapted to be used by veterinary surgeons for confining the animals during surgical operations.

With the above object in view the stock comprises a frame supported upon suitable legs and having a shelf upon which the operator may stand during the shoeing or surgical operation. A cage is pivotally mounted in the stand and is provided at its sides with detachable barriers. The said barriers are provided with straps adapted to pass over the back of the animal when it is positioned in the cage and the said cage is provided with straps adapted to pass under the belly of the animal when in the cage. The cage is further provided with a detachable floor which may be removed from the cage after the animal is secured therein and before the cage is turned from an upright to an inverted position. Suitable cables are connected with the floor for raising and lowering the same and means are provided for operating the cables.

Stock blocks are detachably mounted in the barriers of the cage and are adapted to receive the ankles of the animal whereby the legs are confined during the operation.

Figure 2:
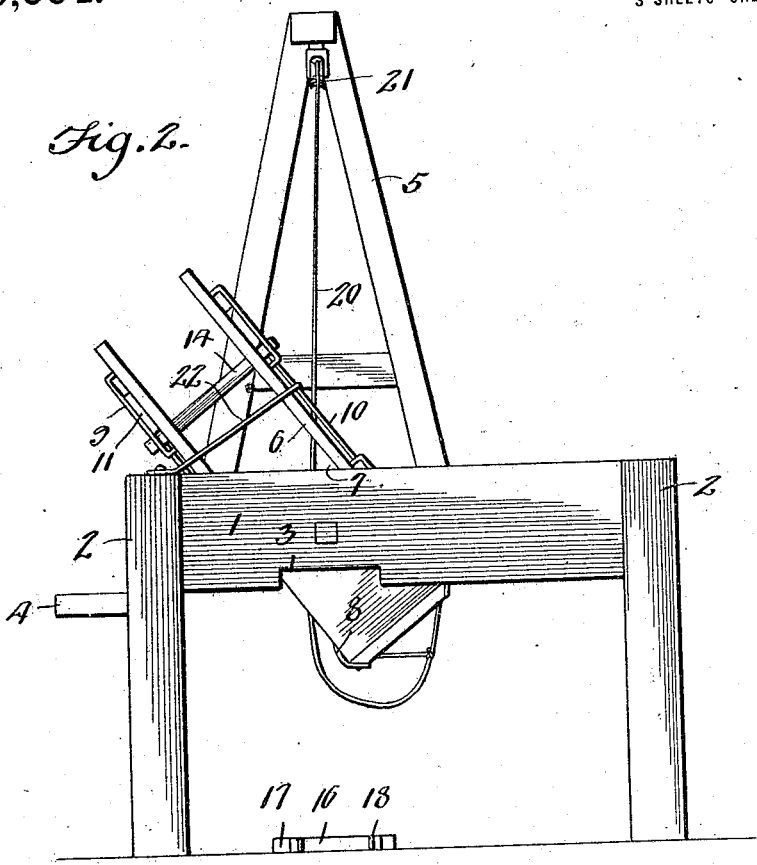
Figure 6:
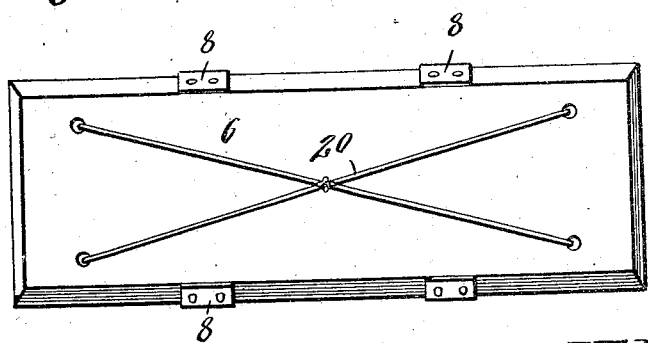
Figure 3:
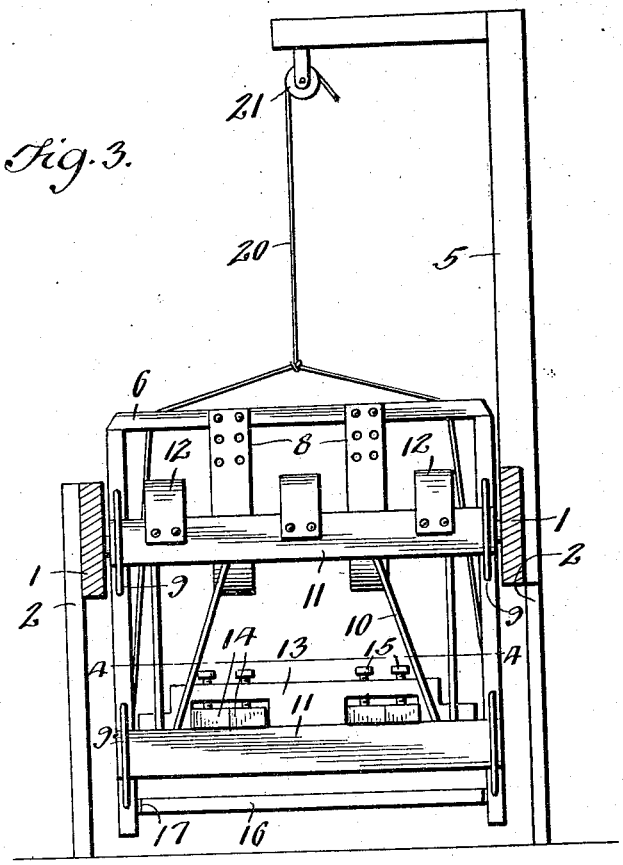
Figure 4:
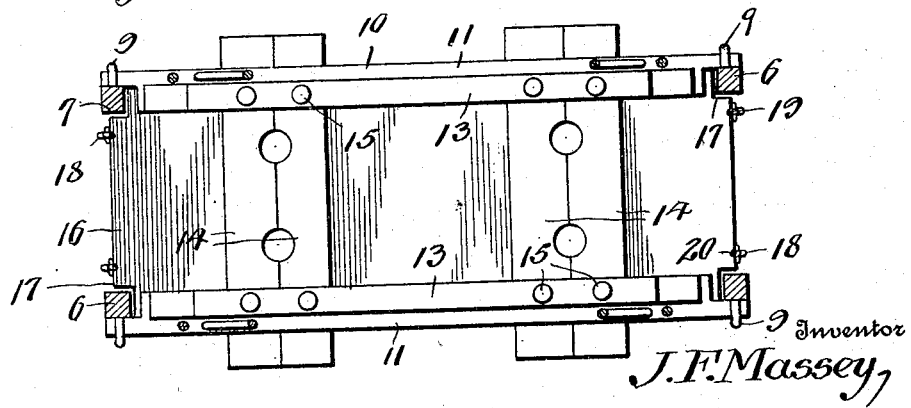

In the accompanying drawings:—Figure 1 is a side elevation of the stock showing the cage thereof in upright position. Fig. 2 is a similar view showing the cage in an inverted position. Fig. 3 is a transverse sectional view of the stocks showing the cage in side elevation. Fig. 4 is a horizontal sectional view of the same cut on the line 4—4 of Fig. 3. Fig. 5 is a transverse sectional view of the cage. Fig. 6 is a top plan view of the same.

The stock comprises a frame 1 which is mounted upon suitable legs 2, said frame being provided at its opposite sides and at its lower edges with recesses 3. A shelf 4 is mounted at one side of the frame 1 and the said recesses 3 are located nearer that side of the frame at which the shelf 4 is located than the opposite side of the said frame. A derrick 5 is mounted upon the frame 1 above one of the recesses 3.

A cage 6 is pivotally mounted in the frame 1 and the said cage is provided at its ends with recesses 7 adapted to register with the recesses 3 at the sides of the frame 1. Straps 8 are secured at one end to the intermediate portion of the cage 6 and the other ends of the said straps may be adjustably secured to the said cage whereby the intermediate portions of the strap may lie under the intermediate portion of the cage. Guides 9 are provided at the sides of the cage 6 and in the vicinity of the ends thereof. Barriers 10 are provided with side bars 11 which are detachably received in the said guides 9. Straps 12 are secured to the upper portions of the barriers 10 and are adapted to lie over the back of the animal when the same is in position in the cage. Guides 13 are mounted upon the lowermost bars 11 and stock blocks 14 are removably mounted in the guides 13. The guides 13 are provided with set screws 15 which are adapted to engage the stock blocks 14 whereby the said blocks are held in position in the said guides and fixed with relation to the barriers 10. When the stock blocks 14 are in position they are transversely disposed across the lower portion of the cage 6.

A floor 16 is detachably mounted in the lower portion of the cage 6 and the said floor is provided at its corner portions with recesses 17 adapted to receive the end portions of the cage 6. Eyes 18 are mounted at the ends of the floor 16 and receive hooks 19 which are attached to the lower ends of cables 20. The cables 20 are trained through the intermediate portion of the cage 16 and are suitably trained over a pulley 21 mounted upon the derrick 5. A hook 22 is pivotally mounted upon the frame 1 and may be engaged with one end of the cage 6 for holding the same in an inverted position during the operation upon the animal which is confined in the cage.

In operation the barriers 10 are removed from the cage and the floor 16 is lowered so that it rests upon the floor or ground below the frame 1. The animal is then led into the cage through one of the recesses 7 and is permitted to stand upon the floor 16. The straps 8 are then passed under the belly of the animal and secured at their ends to the intermediate portion of the cage 6. The cables 20 are then drawn longitudinally whereby the floor 16 is elevated and the animal is raised in the cage. The straps 12 are then placed over the back of the animal and the barriers 10 are extended along the sides of the animal and the bars 11 of the said barriers are inserted in the guides 9. The straps 8 are then tightened by pulling or otherwise to lift some or all of the weight of the animal from the floor 16. The cables 20 are then paid out so that the floor 16 is lowered and then by detaching the hooks 19 from the eyes 18 the floor 16 is removed from the cage 6. Thus the animal is suspended in the cage by the straps 8. Prior to lowering the floor the stock blocks 14 are inserted in the guides 13 and secured therein by means of the set screws 15 whereby the blocks surround the ankles of the animal and confine the legs. The cage 6 is then turned over and assumes an inverted position in the frame 1 and the hook 22 is engaged with the end of the cage whereby the said cage is held in the said inverted position. Thus the hoofs of the animal are upwardly disposed and the operator who stands upon the shelf 4 may readily apply shoes to the hoofs or perform any other operation upon the confined animal. After the completion of the operation the manipulation of the parts of the stock as hereinbefore described is reversed whereby the animal is swung from an inverted to an upright position and may be led out of the cage.

From the foregoing description taken in conjunction with the accompanying drawing it will be seen that an animal stock of simple and durable structure is provided and that the same may be easily and quickly manipulated for properly positioning an animal to perform shoeing or surgical operations upon the same and the apparatus may especially be used to advantage for confining wild or nervous animals during such operations.

Having described the invention what is claimed is:—

1. An animal stock comprising a frame, a cage pivotally mounted therein, straps carried by the cage and adapted to be passed under the belly of the animal, barriers movably mounted on the cage, straps carried by the barriers and adapted to be passed over the back of the animal and stock blocks carried by the barriers for confining the legs of the animal.

2. An animal stock comprising a frame, a cage pivotally mounted therein, straps carried by the cage and adapted to be passed under the belly of the animal, barriers movably mounted upon the cage, straps carried by the barriers and adapted to be positioned over the back of the animal, stock blocks movably mounted in the barriers, a floor movably mounted in the cage and means for moving the floor.

In testimony whereof I affix my signature.

JAMES F. $\overset{\text{his}}{\underset{\text{mark}}{\times}}$ MASSEY.

Witness:
C. G. MUNDY.

Copies of this patent may be obtained for five cents each, by addressing the "Commissioner of Patents, Washington, D. C."